United States Patent
Rodriquez et al.

(10) Patent No.: US 7,093,298 B2
(45) Date of Patent: Aug. 15, 2006

(54) APPARATUS AND METHOD FOR SECURITY OBJECT ENHANCEMENT AND MANAGEMENT

(75) Inventors: Herman Rodriquez, Austin, TX (US); Newton James Smith, Jr., Austin, TX (US); Clifford Jay Spinac, Austin, TX (US); Maria Azua Himmel, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 811 days.

(21) Appl. No.: 09/942,634

(22) Filed: Aug. 30, 2001

(65) Prior Publication Data
US 2003/0159059 A1   Aug. 21, 2003

(51) Int. Cl.
*H04L 9/00* (2006.01)
*H04L 9/32* (2006.01)
*H04K 1/00* (2006.01)

(52) U.S. Cl. .................... 726/28; 726/2; 713/167; 713/170; 713/182

(58) Field of Classification Search .......... 713/166, 713/167, 182, 200; 726/28
See application file for complete search history.

(56) References Cited

U.S. PATENT DOCUMENTS

| | | | |
|---|---|---|---|
| 5,335,346 A * | 8/1994 | Fabbio | 711/163 |
| 5,365,574 A | 11/1994 | Hunt et al. | 379/88 |
| 5,369,702 A * | 11/1994 | Shanton | 713/166 |
| 5,592,553 A | 1/1997 | Guski et al. | 380/23 |
| 5,606,663 A | 2/1997 | Kadooka | 395/188.01 |
| 5,619,571 A | 4/1997 | Sandstrom et al. | 380/4 |
| 5,661,807 A | 8/1997 | Guski et al. | 380/25 |
| 5,752,244 A | 5/1998 | Rose et al. | 707/5 |
| 5,802,276 A * | 9/1998 | Benantar et al. | 713/200 |
| 5,881,230 A * | 3/1999 | Christensen et al. | 709/203 |
| 5,922,073 A | 7/1999 | Shimada | 713/200 |
| 5,944,825 A | 8/1999 | Bellemore et al. | 713/202 |
| 5,991,877 A * | 11/1999 | Luckenbaugh | 713/200 |
| 6,029,247 A | 2/2000 | Ferguson | 713/201 |
| 6,047,377 A * | 4/2000 | Gong | 713/201 |
| 6,073,242 A | 6/2000 | Hardy et al. | 713/201 |
| 6,107,935 A | 8/2000 | Comerford et al. | 340/825.31 |
| 6,163,844 A * | 12/2000 | Duncan et al. | 713/201 |
| 6,173,404 B1 * | 1/2001 | Colburn et al. | 713/200 |
| 6,289,462 B1 * | 9/2001 | McNabb et al. | 713/201 |
| 6,292,900 B1 * | 9/2001 | Ngo et al. | 713/200 |
| 6,654,669 B1 * | 11/2003 | Eisenmann et al. | 701/1 |

FOREIGN PATENT DOCUMENTS

JP     10091266 A     4/1998

* cited by examiner

*Primary Examiner*—Kambiz Zand
(74) *Attorney, Agent, or Firm*—Duke W. Yee; Mark S. Walker; Wayne P. Bailey

(57) ABSTRACT

An apparatus and method for security object enhancement and management are provided. The apparatus and method make use of security objects in which security object data is encapsulated with security object attributes and methods defining the way in which the security object may be used. Because the security object is an encapsulated object, the security object may operate on itself to perform security object management operations. Furthermore, because the security object need not be linked to the items requiring security object protection a priori, the security object may be defined in any manner deemed appropriate by the user. As a result, users of the security objects are given greater freedom in defining the security object, the security object content type, and the way in which the security object may be used.

51 Claims, 7 Drawing Sheets

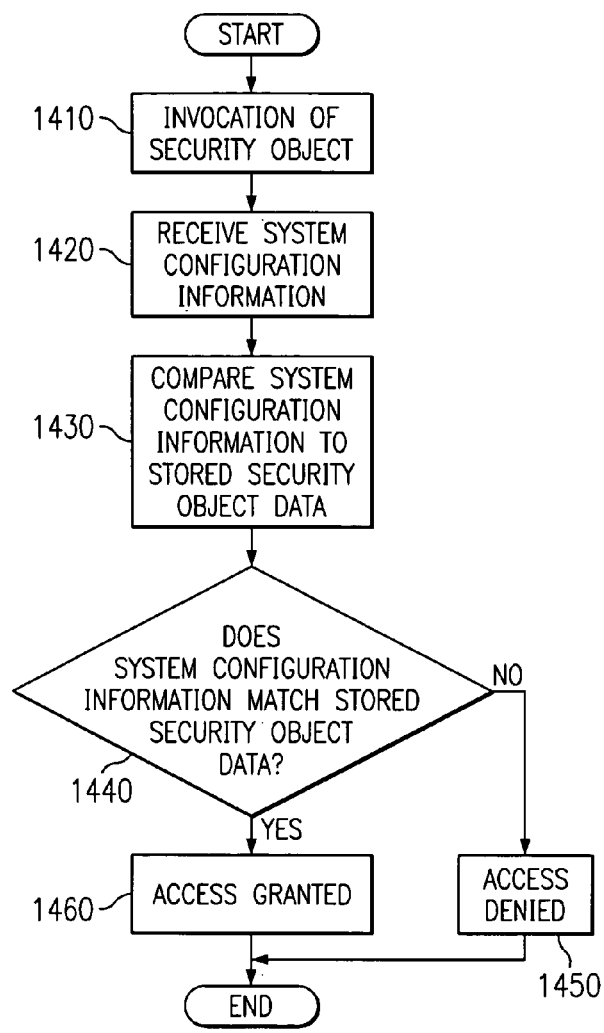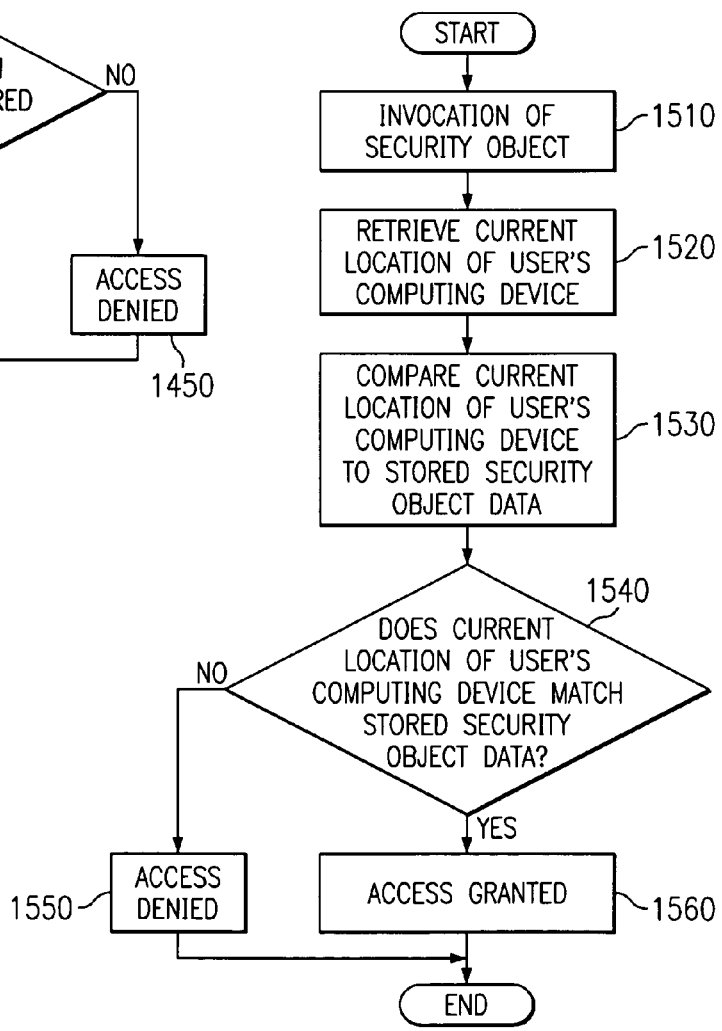

APPARATUS AND METHOD FOR SECURITY OBJECT ENHANCEMENT AND MANAGEMENT

BACKGROUND OF THE INVENTION

1. Technical Field

The present invention is directed to an improved computing device. More specifically, the present invention is directed to an apparatus and method for security object enhancement and management.

2. Description of Related Art

Passwords are used universally to control access to everything from computer resources to bank accounts, burglar alarms, automobiles, television viewing, and the like. Known passwords consist of simple text strings that a user must enter in order to obtain access to a secured item. The entered password is typically checked against the password stored to determine a match. If the entered password and the stored password match, access is granted.

There are many methods used to create passwords, ranging from assigning fixed and constant strings that must be memorized by the user to more elaborate methods allowing the user to recall a password string using a hint phrase, for example. Based on common human factors and tendencies for simplicity in recalling a password, a user may use a familiar but secret text string such as a family tradition, an important date, or even a common word from a dictionary.

Mechanisms for managing passwords must be programmed into the applications with which they are associated. That is, there must be a program external to the password that is used to authenticate the password, check to see if the password is about to expire, and determine the access granted. As a result, every single item, such as a web site, a computer resource, a bank account, a burglar alarm, and the like, must have password management operations coded into them to process and authenticate a specific type of password content. Therefore, the user has no control over how the password is to be used by the password management operations. Moreover, the owner/operator of the item with which the password management operations are associated must make changes directly to the code of the password management operations if she wishes to change the way in which passwords are used.

Furthermore, each item typically can only accept a single type of password content. Thus, there is very little freedom on the part of the user to define her own password, password content type, and how the password is to be used. Moreover, there is little freedom, due to the expense and effort required to modify password management operations, on the part of the owner/operator to allow different types of password contents and different usage of passwords. Therefore, it would be beneficial to have an apparatus and method for password enhancement and management in which users and owner/operators are provided greater freedom in defining passwords and the manner in which the passwords are used.

SUMMARY OF THE INVENTION

The present invention provides an apparatus and method for security object enhancement and management. The apparatus and method make use of security objects in which security object data is encapsulated with security object attributes and methods defining the way in which the security object may be used. Because the security object is an encapsulated object, the security object may operate on itself to perform security object management operations. Furthermore, because the security object need not be linked directly to the items requiring security object protection a priori, the security object may be defined in any manner deemed appropriate by the user.

As a result, users of the security objects are given greater freedom in defining the security object, the security object content type, and the way in which the security object may be used. In addition, since the user defines his/her own security object, and the security system using the security object acts as simply a repository for security objects, much of the liability of maintaining security is off loaded from the owner/operator of the security system, such as a financial institution, electronic marketplace, electronic business, secured building or facility, and the like, onto the individual users. The owner/operator of the security system need only maintain the object in a secured manner within the repository. These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 14 is a flowchart outlining an exemplary operation of the present invention with a security object augmented by CPU ID/Speed/System Configuration; and FIG. 15 is a flowchart outlining an exemplary operation of the present invention with a security object valid from specific locations.

DETAILED DESCRIPTION OF THE PREFERRED EMBODIMENT

Figure 1:
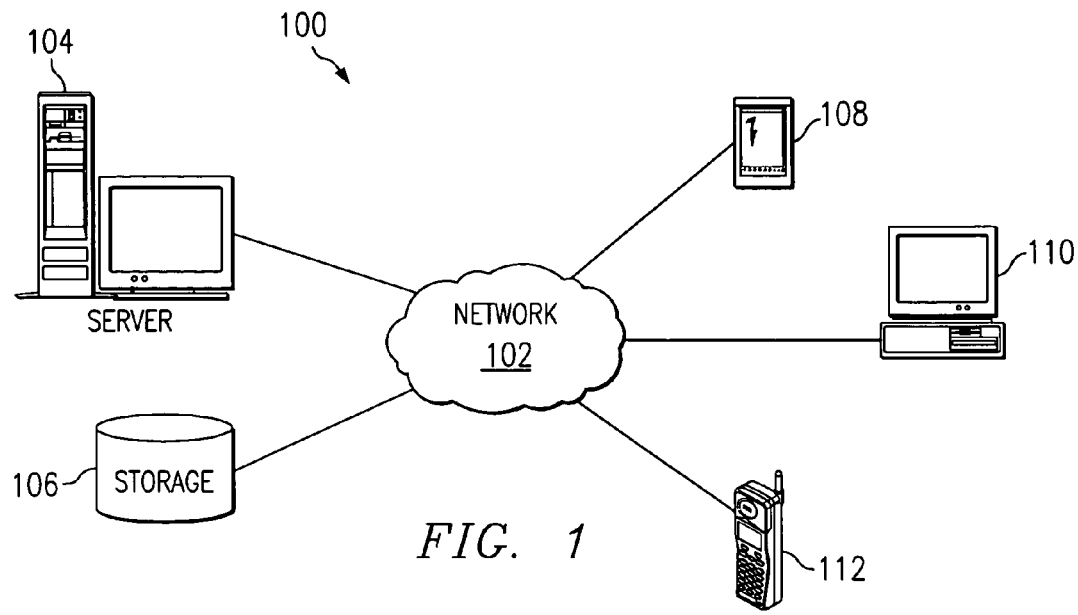
FIG. 1 is an exemplary diagram illustrating a distributed data processing system in accordance with the present invention.

The security object according to the present invention may be implemented in any device that uses security object protection to provide security. Such devices may include, for example, automobiles, computer resources, a server device, a client device, a stand alone computing device, security systems, banking systems, television devices, mobile telephones, and the like. In short, any device that has a data processing capability may make use of the present invention without departing from the spirit and scope of the present invention.

The present invention may be used by any business or non-business entity that is interested in maintaining security while reducing liability and providing user's with greater freedom in defining their personal type and level of security. For example, business entities such as financial institutions, credit card companies, electronic marketplaces, electronic businesses, parking garages, hotels, automobile rental businesses, personal storage facilities, and the like, may make use of security systems in which security objects according to the present invention are utilized. Moreover, non-business entities, such as government facilities, secured buildings, and the like, may also make use of security objects according to the present invention.

In addition to business and non-business entities, individual users may make use of the present invention to secure their personal contents. For example, the present invention may be used by individual users to secure automobiles, computer systems, houses, apartments, storage containers, safes, and the like. In short, the present invention may be used anywhere contents are to be secured, whether those contents be physical or electronic. Thus, the present invention may be used in replacement of or in conjunction with passwords, personal identification numbers (PINs), physical keys, keycards, and other security mechanisms.

With the present invention, a user defines her own security data and the type of that security data, such as audio data, graphical data, textual data, biometric data, and the like. The user and/or security system may define the manner by which the security data is used. The security data, attributes defining characteristics of the security data, and methods for operation on the security data are encapsulated into a security object which may then be used with a security system for controlling access to secured contents.

The mechanism for defining the security object may be provided locally, such as on a client computing device, or remotely, such as by a remotely located server. When provided locally, a security object foundry application may be provided on the client computing device through which a user may define the security object to be used with one or more security systems. This security object may then be provided to the security system for later use in verifying input data received from the user during an attempt to access secured contents.

When provided remotely, the security object foundry application may be located on the remote server. The remote server may provide one or more interfaces through which a user may define the security object. Such interfaces may be provided, for example, as Web pages, applets, electronic forms, and the like. The remote server may be part of a business or non-business entity's computing system through which a user may gain access to secured contents associated with the business or non-business entity.

As touched on above, one exemplary environment for which the present invention is exceptionally suited is a distributed data processing system in which client computing devices communicate with server computing devices. Thus, this environment will be used as an illustration of the features of the present invention. The use of a distributed data processing system in the following descriptions is not intended to imply any limitation of the present invention to such an environment and any computing environment may be used with the present invention without limitation.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communication links between various devices and computers connected together within network data processing system 100. Network 102 may include connections such as wire, wireless communication links, or fiber optic cables.

In the depicted example, server 104 is connected to network 102 along with storage unit 106. The server 104 may be a reservation server that is capable of making reservations in accordance with the present invention, as described in greater detail hereafter.

In addition, clients 108, 110, and 112 are connected to network 102. These clients 108, 110, and 112 may be, for example, personal computers, personal digital assistants, (PDAs), cellular telephones, wireless two-way pagers, network computers, or any other computing device capable of communication via the network 102. In a preferred embodiment, these client devices 108, 110 and 112 are modified to include software instructions for implementing client side operations of the present invention, as described hereafter. However, the present invention is not limited to such an embodiment and all of the operations of the present invention may be implemented in server 104 without departing from the spirit and scope of the present invention.

In the depicted example, server 104 provides data, such as boot files, operating system images, and applications, to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
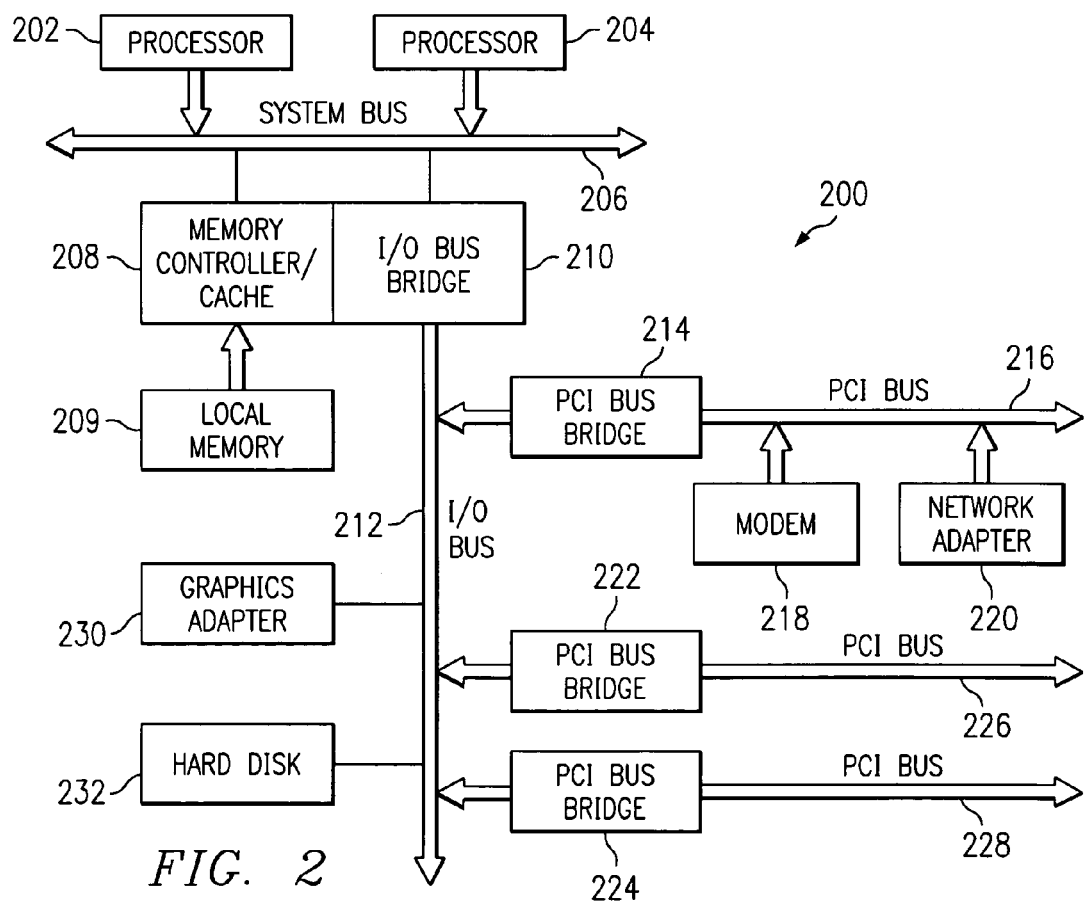
FIG. 2 is an exemplary diagram illustrating a server data processing device in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 g may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in adapter cards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
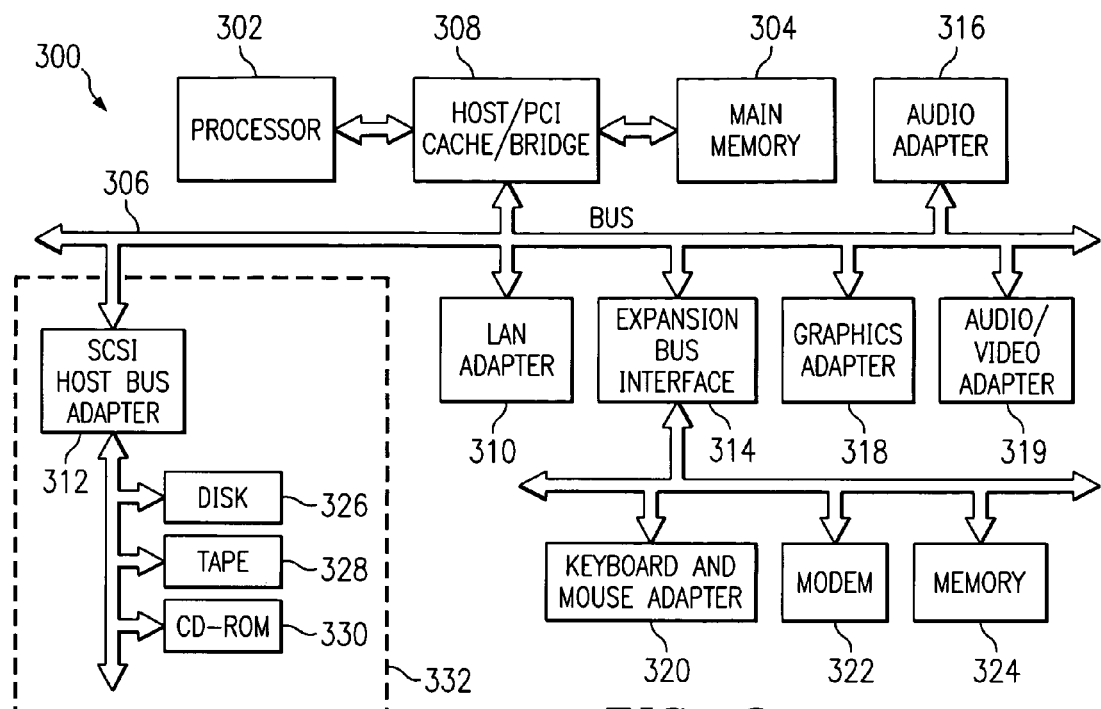
FIG. 3 is an exemplary diagram illustrating a client data processing device in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, SCSI host bus adapter 312 and expansion bus interface 314 are connected to PCI local bus 306 by direct component connection. In contrast, local area network (LAN) adapter 310, audio adapter 316, graphics adapter 318, and audio/video adapter 319 are connected to PCI local bus 306 by add-in adapter cards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with memory and/or flash memory in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a mechanism by which security objects are created and managed. The security objects include security object data, attributes and methods for using the security object data and attributes in managing the security object. Objects are independent program modules written in object-oriented programming languages. Similar to the way in which hardware components are routinely designed as modules to plug into and work with each other, objects are software components designed to work together at runtime without any prior linking or pre-compilation as a group.

With objects it does not matter which source programming language is used to generate the objects or which computer on the network they are running in. They are designed to interoperate strictly through the messages passed between them. Objects are encapsulated, meaning that they are self-sufficient modules that contain the data and the processing for the data, e.g., the data structure and functions that manipulate that data.

An object is created from a class of data types. A class is a user-defined data type that defines a collection of objects that share the same characteristics. The class contains methods used by objects in the class. Methods are the processing that an object performs. For example, in a payroll system, a class could be defined as Manager, and Pat and Jan, the actual objects, are instances of that class. Pat and Jan will have methods associated with them which are obtained from the user-defined class.

The present invention uses a security object class or classes to generate security objects. The security object includes the security object data, the security object attributes, and the methods used to manage the use of the security object. The security object data contains the information that defines the security object. This information may include a text string, a voiceprint, a fingerprint, a retina pattern, other types of biometric data, a series of tones, a combination of inputs, a rolling code or any other data that may be used to identify an authorized user.

The security object attributes include information about the security object data including, for example, the type of security object content data, how the security object data was generated, expiration times of the data, how many users can use the security object at a same time, and any other attribute information. The attribute information and the security object data are operated on by the encapsulated methods which define the processing of the security object data, attributes, and any parameters passed to the object.

Because the security object is a self contained object, the applications that invoke the object need not be hard coded with routines and the like, to process the object. Moreover, since the applications that invoke the object need not be hard coded, the types of security object contents that may be used is not limited to one type. Rather, the user of the security object is able to designate the type of security object content and further, the manner by which the security object may be used. As a result, the various permutations necessary to decipher the security object is made sufficiently great so as to deter unauthorized users from attempting to decipher the security object.

Typically, in known password based security systems, the security system defines the type of password content and the way in which the password is used. For example, the security system may designate that passwords consisting of alphanumeric characters between 6 and 25 characters long may be used as passwords. Furthermore, the security system may designate that the password is used to obtain access to certain resources. Of course, the programs that are used to perform the functions of the security system must be coded, thereby requiring extra expense to the owner or operator of the security system in their creation and implementation and also reducing the flexibility of the security system.

The present invention eliminates the drawbacks of the known systems by using security objects. By using security objects, a user may define her own security object which may be of any type. Thus, the user is not limited to the particular type of security object content that is hard coded into the source security system. Moreover, the user may define how the security object is to be used, e.g., what methods may be invoked on the security object.

In addition, the source of the security concern, i.e. the place or source that wishes to impose security restrictions, need not hard code procedures for implementing various types of security object contents. Because the security object is a self contained object that contains both the security object data and the methods for execution on the data passed to the object, the source security systems need not have any special algorithms for handling the particular type of security object content.

Figure 4:
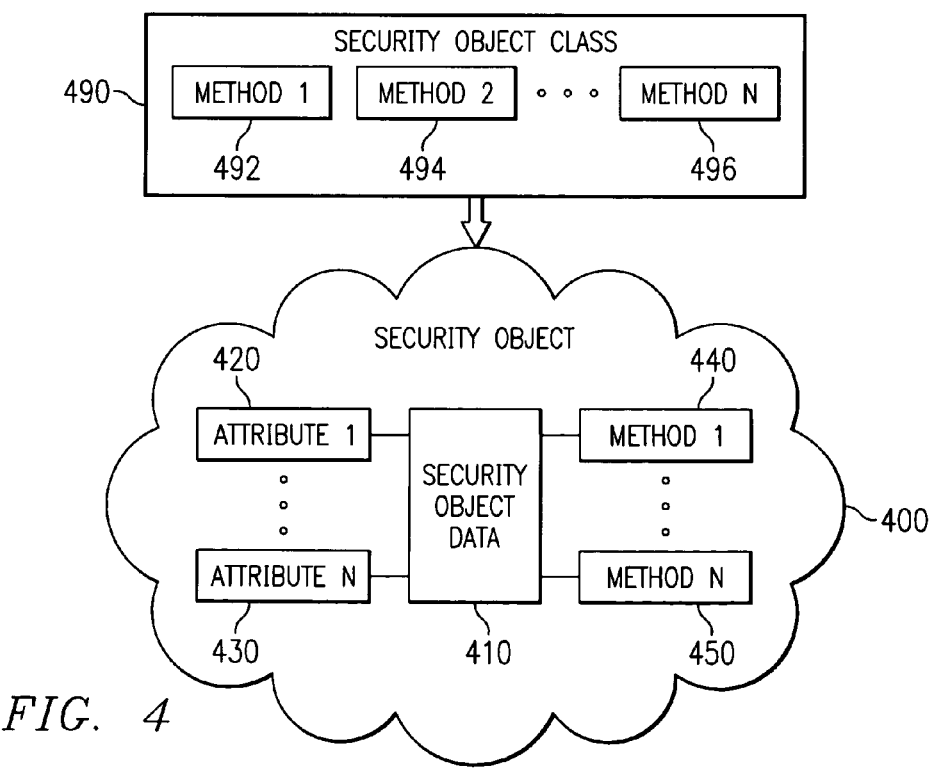
FIG. 4 is an exemplary diagram of a security object according to the present invention.

FIG. 4 is an exemplary diagram illustrating how a security object may be generated. As shown in FIG. 4, a security object class 490 is defined that includes a plurality of methods 492–496 that may be used to process the security object data 410. The class is comprised of variables that designate the state of the class and methods that designate the types of messages that the class can operate on and the operations that are performed.

An instance of the security object class 490 may be created by taking security object data 410 and attribute data 420–430 associated with the security object data 410 and encapsulating it with the methods 440–450 obtained from the security object class 490. Although security object data 410 is shown as a separate component from attribute data 420–430, in actuality, the security object data 410 is a special attribute of the security object. Instantiation of objects from classes is generally known in the art and therefore, a detailed description of such will not be offered here.

The attributes 420–430 identify the state of the security object, and the security object data 410 is the security object itself. The methods 440–450 operate on messages sent to the security object 400 requesting the object be used in a certain manner or perform certain processing on itself. The methods 440–450 are typically obtained from the methods 492–496 of the class. The security object 400 may be stored for later use in authenticating and controlling access to secured contents such as system resources, user accounts, physical containers, vehicles, dwellings, and the like.

As previously mentioned, the security object 400 may be created and used by a client device, a server device, system resources, or any combination of the above, in a distributed data processing system such as that shown in FIG. 1 or a stand-alone system. For example, a user of a client device may define her own security object using her client device and upload this security object to a server or resource. Alternatively, a server may create a security object by requesting a user of a client device to provide the security object data, and possibly one or more security object attributes, which is then encapsulated into a security object by the server.

The security object is preferably stored in association with a user identification so that the security object may be retrieved when a user entering her user identification attempts to gain access to a particular system resource. Thus, for example, if a user were to enter her user identification and security object data into her client device and transmit this information to the server, the server may retrieve the security object associated with the user identification and send the security object a message requesting that the security object authenticate the security object data entered by the user. The message sent to the security object would include the security object data entered by the user which is then operated on by the methods of the security object.

Figure 5:
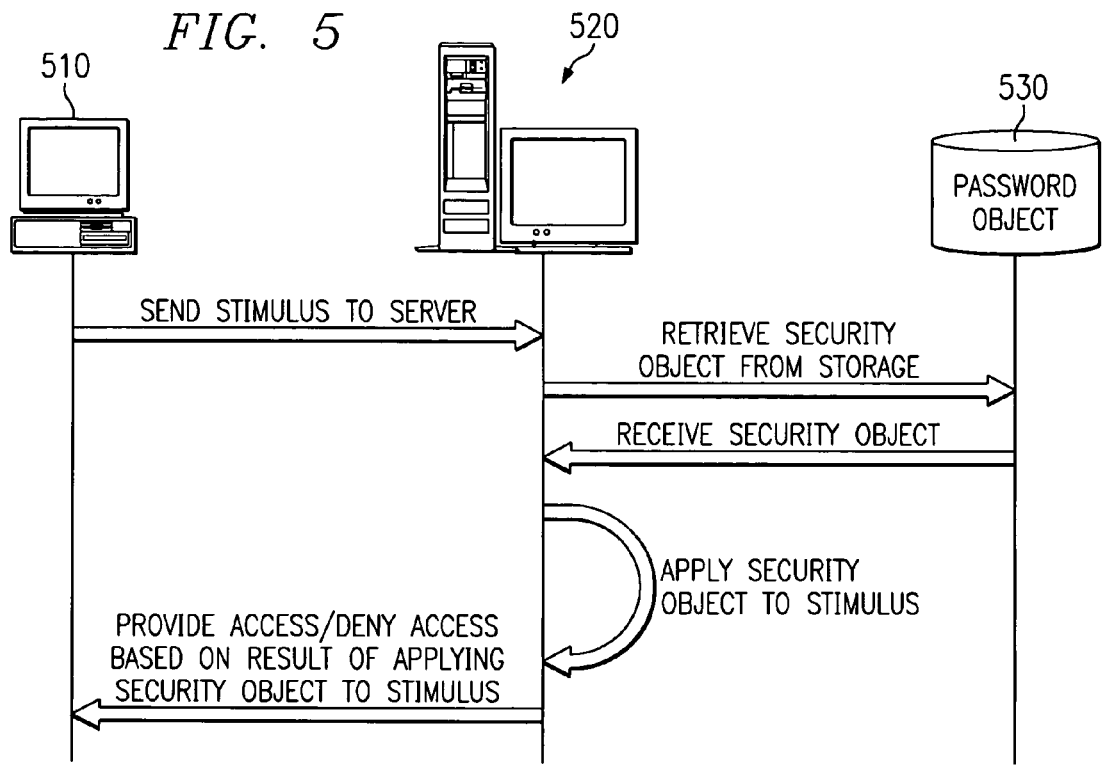
FIG. 5 is a diagram illustrating how the security object of the present invention may be used with a stimulus to determine whether and what type of access may be granted.

FIG. 5 is an exemplary diagram illustrating a message flow between a client device 510 and a server 520 using the security object of the present invention. The message flow assumes that a security object is previously stored in a storage device 530 associated with the server 520. The security object may be created and stored in the storage device 530 in any appropriate manner. For example, a graphical user interface (GUI) may be provided through which the user may provide the security object data and optionally one or more attributes. The GUI may be provided by the client device or the server.

The GUI of the present invention acts as a "security object foundry" where a user may generate security objects of one or more types. For example, the user of the security object foundry may be provided with one or more themes including audio security objects, visual security objects, GPS location based security objects, alphanumeric security objects, biometric data based security objects, and the like. The user may select a theme and be provided with prompts for providing security object data and for selecting the methods and attributes to be encapsulated with the security object data.

After having received the security object data, and optionally one or more attributes and one or more method selections, the server or client security object foundry may encapsulate the security object data and the one or more attributes and methods into a security object. Such encapsulation may include the server or client application providing additional attributes or methods for the security object that are not specifically selected or provided by the user.

For example, assume that a user provides security object data, an attribute indicating the type of security object content, e.g., voiceprint, fingerprint, series of tones, text string, etc., and a maximum number of users that may simultaneously log on using this security object. The server application may take this security object data and the attributes and encapsulate them with additional attributes and/or methods indicating that users that log onto the server with this security object are given a low level of access to system resources, they are limited to a specific period of time for accessing resources, and are not allowed to access the system resources on weekends. These additional attributes are added to the attributes supplied by the user and encapsulated into a security object.

Alternatively, the user may submit the security object data and the user selected attributes to the server application as a security object. Additional attributes and/or methods may still be added by the server as a further encapsulation of the security object by wrapping the additional attributes around the security object submitted by the user. Such wrapping is available due to the inheritance provided by objects. That is, the methods in the security object will be inherited by the resultant object which includes the security object and the wrapped additional attributes and/or methods.

When a user attempts to gain access to a system resource, the user enters her user identification and security object data input, hereafter referred to as the "stimulus," into an interface on his client device 510. The interface may be, for example, a GUI, a HyperText Markup Language (HTML) web page, an HTML form having fields for entry of user identification and security object data, and the like. The client device 510 then transmits this stimulus to the server 520.

In response to receiving the stimulus from the client device 510, the server 520 retrieves a security object from the storage device 530 corresponding to the user identification. The server 520 then sends the security object a message requesting that the security object perform certain functions on itself using the security object data entered by the user. Such functions may include, for example, authentication, determination of access level, and the like. The functions performed may be any functions to which a security object may be applied. The functions are performed by the methods encapsulated in the security object.

By encapsulating security data and code into a security object using the present invention, there are a number of advantages obtained over conventional security methods. First, the user may define her own security object without limitations placed on her by the server applications. Because the security object is a self-contained object that does not need to be linked to the server application, the security object may contain any type of security object content data deemed appropriate by the creator of the security object. Therefore, the user that creates the security object may designate that she wants her security object to be a text string, a voiceprint, a fingerprint, a retina pattern, a text string followed by a swipe of a credit card in a credit card reading apparatus, a text string and a set of Global Positioning System (GPS) coordinates, a series of tones, etc. and various combinations of these. The server application need not be concerned with the type of security object content provided by the user.

As a result of the above, the user is given greater freedom in defining the security content and security level that she wishes to use. Moreover, security of the security object is increased since the number of permutations necessary to decipher a security object that may take many different forms is dramatically increased. Moreover, server applications are not now limited to using only one type of security object content to provide security object protection on system resources. Rather, the server applications may use any security object content type that users wish to provide.

In addition, the user may set various attributes regarding the use of the security object and the server application, or entity allowing use of the security object to access resources, may set various other attributes regarding the use of the security object. The methods of the security object operate on the attributes and any data passed to the object by external messages, to thereby make use of the security object.

An important advantage for owners/operators of security systems that make use of the security objects of the present invention is that liability for maintaining security is reduced. Since the user is the one defining the security object, and thus, the level of security, much of the liability associated with maintaining security is shifted to the user. The owners/operators of the security systems must still maintain the security objects themselves in a secure manner, however. Thus, the owners/operators of the security system essentially become a secure repository for security objects and are relieved of the burden and liability of maintaining a complex security system.

Figure 6:
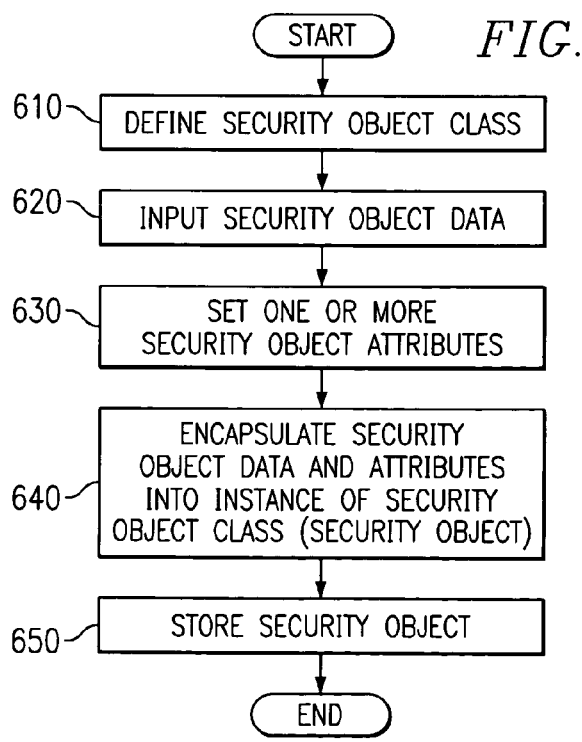
FIG. 6 is a flowchart outlining an exemplary operation of the present invention when generating a security object.

FIG. 6 is a flowchart outlining an exemplary operation of the present invention when defining a security object. As shown in FIG. 6, the operation starts with the definition of a security object class (step 610). The defining of a security object class may include defining various attributes of the class, i.e. variables identifying a state, and methods of the class, i.e. processes that may operate on the attributes and data of the class. Security object data is input (step 620) and one or more attributes are set (step 630). The security object data and one or more attributes are then encapsulated into an instance of the security object class, i.e. a security object (step 640). The security object is then stored for later use (step 650). Storage of the security object may include uploading the security object to a server or remote device which is to use the security object to provide access to secured items.

Figure 7:
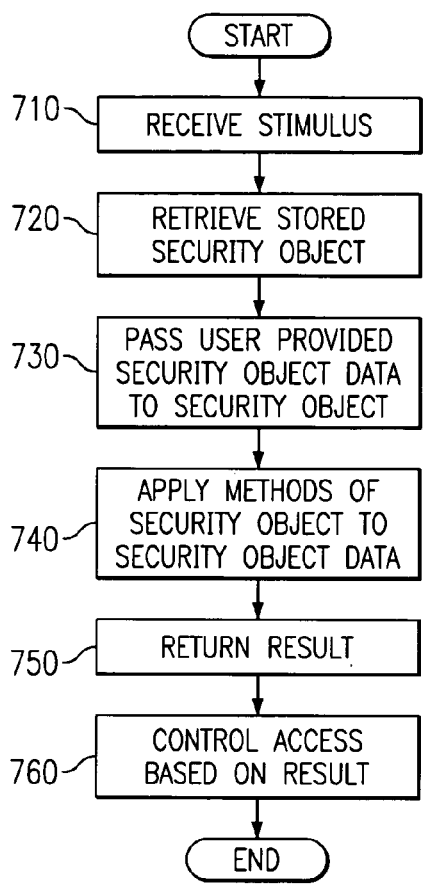
FIG. 7 is a flowchart outlining an exemplary operation of the present invention when using a security object.

FIG. 7 is a flowchart outlining an exemplary operation of the present invention when using the security object to determine whether to grant access to a secured item. As shown in FIG. 7, the operation starts with receiving a stimulus, e.g., a user identification and user provided security object data input (step 710). The stored security object is retrieved, e.g., based on the user identification (step 720). The security object data input received from the user is then passed to the security object in a message requesting authentication of the security object data (step 730). The methods of the security object then operate on the security object data input, the security object data stored in the security object, and the attributes of the security object to determine if access should be granted (step 740). The security object returns a message to the invoking application indicating the results of applying the security object to the security object data input (step 750). Based on the return message, the application determines whether to grant access or deny access (step 760). The operation then ends.

Thus, the present invention provides a flexible security object enhancement and management mechanism by which users may designate their own types of security objects and applications using the security objects may make use of many different types of security object types. In addition, the present invention allows the processing of the security object to be encapsulated with the security object data such that applications making use of the security object of the present invention need not be hard coded with instructions for using each type of security object data.

Of course there are many modifications that may be made to the preferred embodiments described above without departing from the spirit and scope of the present invention. For example, rather than having all of the methods for implementing the security object being encapsulated in the security object, a partial set of methods may be provided. This partial set of methods may be matched with methods in the security system that makes use of the security object to thereby provide the complete set of methods necessary to implement the security object. In this way, additional security is provided in that the security object will only operate correctly when matched with the appropriate complementary partial set of methods in the security system.

In addition, the methods in the security object may require hardware assistance to operate on security object data passed to the security object for authentication. For example, the security object may require that a hardware encryption device be present in the system applying the security object to the security object data input.

Moreover, it should be noted that the present invention provides a portable security mechanism that may be used with a number of different security systems. For example, the security object data may be stored in any device that has a data storage capability, i.e. an electronic medium, and a means by which the security object data may be transferred to a computing device having a security system in which the security object data is resident. Some possible storage devices for the security object of the present invention include keychains with small memories and transmitters, portable MP3 players, mobile telephones, pagers, electronic wrist watches, remote controls, garage door transmitters, keyless entry devices for vehicles, smartcards, magnetic stripe cards, and the like. All of the possible storage devices are too numerous to set forth herein.

The following exemplary embodiments of the present invention are offered to illustrate the versatility of the present invention in providing flexible security object usage. These exemplary embodiments are provided merely as illustrations and are not intended to imply any limitation on the use of the security object according to the present invention.

It should be kept in mind that the functions described hereafter with regard to the exemplary embodiments are performed by the methods encapsulated in the security object. Thus, there is no need to hard code the computing systems that make use of the security object with instructions for performing these functions. Furthermore, the functions described hereafter may be combined in any manner to obtain even greater security without departing from the spirit and scope of the present invention.

Security Objects That May Be Used Only a Limited Number of Times

The present invention may be used to generate single use security objects or security objects that may be used only a limited number of times. With such security objects, after the security object is used once or the predetermined number of times, the security object is exhausted and cannot be used again. Such security objects may be beneficial as access mechanisms that are provided to transient users.

For example, a single use security object may be provided to a repairman that must gain entry into a house protected by a security object based security system. The owner of the house may generate a security object using the present invention as implemented in the computing device of the security system. The security object data, i.e. the text string, spoken word, etc., may then be provided to the repairman. Once the repairman uses the security object to gain entry to the home once, the security object cannot be used again. In this way, the home may remain secure to subsequent attempts to enter the house even though a security object has been released to an unsecure party and if the password is used again in an attempt to gain access, an alarm may be triggered or access may be denied.

Figure 8:
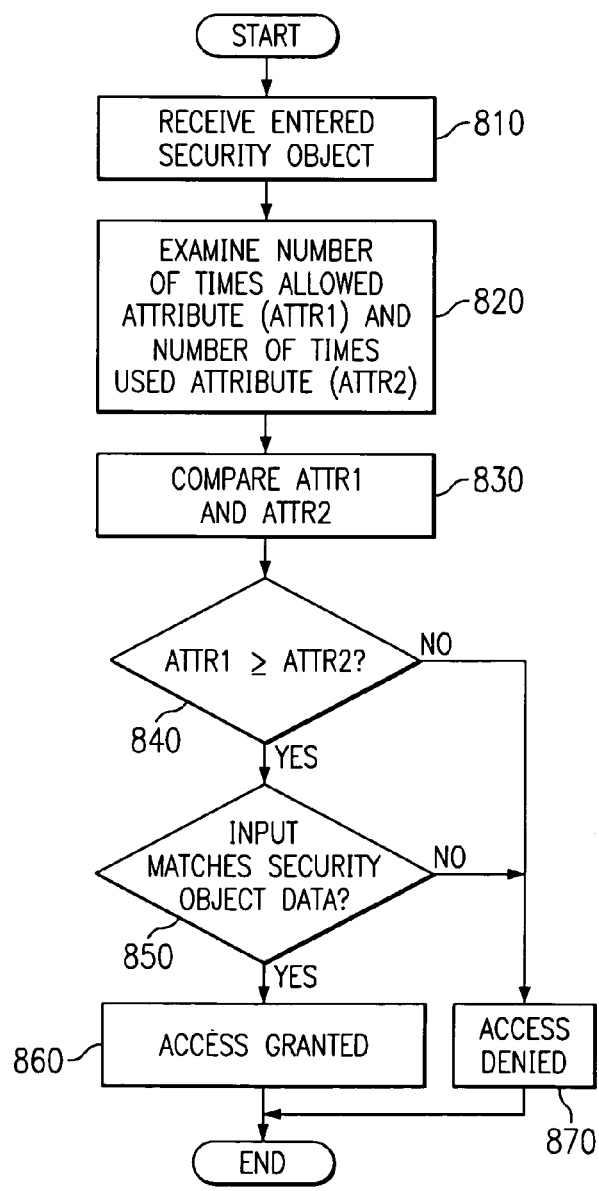
FIG. 8 is a flowchart outlining an exemplary operation of the present invention with a limited number of times of usage security object.

FIG. 8 is a flowchart outlining an exemplary operation for using a security object having a limited number of times of usage. In order to provide such a single use or limited number of times of usage security object, the user may enter the security object data into the computing system and the attribute identifying the number of times the security object may be used. This information is then encapsulated by the computing system into a security object as previously described.

Thereafter, when the repairman, or the like, enters a security input into the computing system, for example, via a number pad on the security system control box, to gain access to the secured item, e.g., the house, the security input is passed to the security object with a message requesting that the security object authenticate the security input (step 810). The methods of the security object then operate on the security object data stored in the security object, the security object attributes, and the security input to determine if access should be granted. Such a determination may be made by the methods by examining the attribute indicating the number of times the security object may be used and another attribute of the security object that indicates the number of times the security object has been used (step 820).

A comparison is made between the two attributes (step 830). If the first attribute is equal to or greater than the second attribute (step 840), a method of the security object is invoked to check to determine if the security input entered by the repairman matches the security object data stored in the security object (step 850). If so, the repairman is provided access to the house (step 860). Otherwise, if the first attribute is less than the second attribute, or the security input does not match the security object data in the security object, access is denied (step 870).

Group Security Objects

The present invention may be used to provide group security objects but still provide individual security to the members of the group. Such group security objects may be hierarchical such that they provide subgroups that may be defined to provide additional security. For example, the group security object of the present invention may include a group part and an individual part. The group part would be common for all members of the group. However, the individual part would be different for each individual member of the group.

As an example, consider a security object that designates a group part to be the alphanumeric string "Password." This group part may be selected by a leader or person of authority in the group. Only this person is provided with access to change the group part of the security object.

On the other hand, each individual user may have a user defined part of the security object. Thus, for example, a first member of the group, Bill, might designate his individual part of the security object to be a voiceprint, while a second member of the group, Jill, might designate their individual part to be a JPEG image.

When the user makes use of the security object, the user must enter the group part and the individual part. The security object operates on both parts to authenticate the data passed to the security object and provide appropriate processing.

Figure 9:
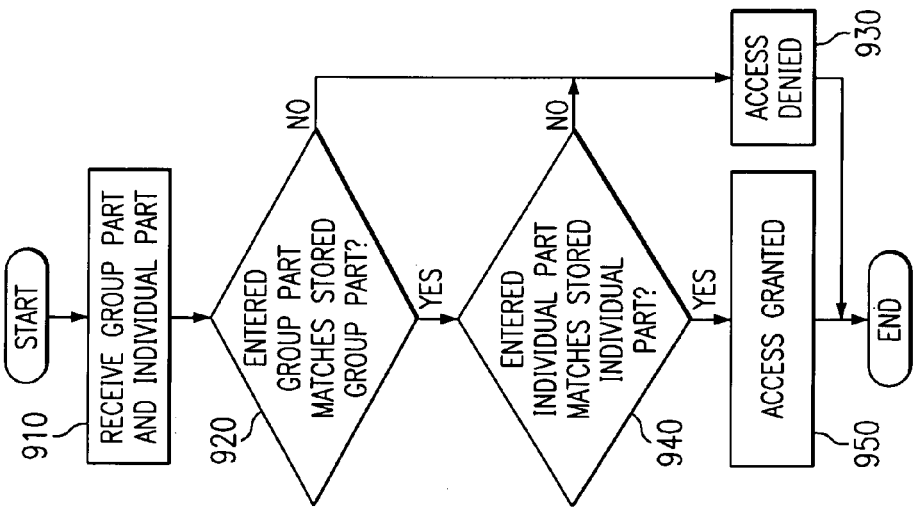
FIG. 9 is a flowchart outlining an exemplary operation of the present invention with a group security object.

FIG. 9 is an exemplary flowchart outlining an exemplary operation for using a group security object. In order to provide such a group security object, a leader or person of authority may designate a group part of the group security object and each member of the group may enter their individual parts into their own version of the group security object along with any attributes associated with their individual parts of their version of the group security object. This information is then encapsulated by into a group security object that may be used by the individual, as previously described.

Thereafter, as shown in FIG. 9, when the user attempts to make use of the group security object, the user enters the group part and their individual part of the group security object (step 910). A check is made to determine if the group part entered by the user matches the stored group part of the group security object (step 920). If not, access is denied (step 930) and the operation ends.

If the group part entered by the user does match the group part stored in the group security object, a check is made as to whether the individual part entered by the user matches the individual part stored in the group security object (step 940). If not, again access is denied (step 930) and the operation ends. If, however, the individual part entered by the user does match the individual part stored in the group security object, access is granted (step 940) and the operation ends.

Timed Security Objects

The security objects of the present invention may be used to provide timed access to secure contents. For example, the security objects of the present invention may be valid only during a specified time period. This specified time period may be a single time period, e.g., the security object is only good between 9 am and 11 am on Apr. 23, 2001, a periodic time period, e.g., the security object is only good between 9 am and 11 am Monday through Friday, or multiple time periods, e.g., the security object is good on April 23, April 27, and May 5–7.

In order to provide a timed security object, the user of the object must provide the security object data and one or more attributes identifying the time(s) when the security object is valid. The methods for verifying the security object data and the valid times are provided by the defined class of security object and are encapsulated with the security object data and attributes.

Figure 10:
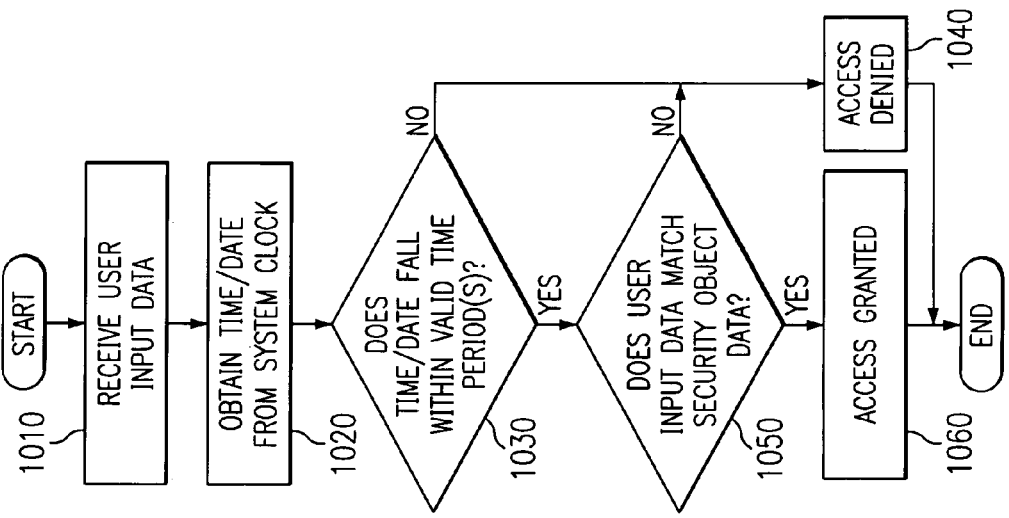
FIG. 10 is a flowchart outlining an exemplary operation of the present invention with a timed security object.

Thereafter, processing of security object data entered by a user is performed in the manner shown in FIG. 10. As shown in FIG. 10, the processing starts with receipt of the user input data (step 1010). A current time and/or date is obtained from a system clock (step 1020). The current time and/or date is processed by methods in the security object to determine if the current time and/or date falls within the time period(s) that the security object is valid (step 1030). If not, access is denied (step 1040) and the operation ends.

If the current time and/or data falls within the valid time period(s), a check is made to determine if the user input data matches the security object data stored in the security object (step 1050). If not, again access is denied (step 1040) and the operation ends. If there is a match, access is granted (step 1060), and the operation ends.

Concurrent Multi-User Security Objects

The present invention may be used to provide concurrent multi-user security objects. A concurrent multi-user security object is a security object that is composed of parts from different users. For example, a joint bank account may require "signatures" of both parties to which the joint bank account belongs.

The entry of the users' inputs to the multi-user security object may be local or remote. That is, for example, each user may be located at the same place or may be remotely located from one another and transmit their inputs to the security system making use of the multi-user security object of the present invention. With the multi-user security object of the present invention, an input from a first party places the security object in an "in-progress" state awaiting input from the other party or parties. Only when inputs from all the required parties are obtained will the methods of the security object be invoked on the inputs and the security object data stored therein.

In order to create such a multi-user security object, each user must submit their portion of the security object data and any attributes associated with their portion of the security object data. The methods used to operate on the inputs passed to the multi-user security object and the security object data are obtained from the multi-user security object class. These methods and the security object data and attributes are encapsulated and provided to the security system that makes use of the multi-user security object. Thereafter, the multi-user security object may be used in the manner outlined in FIG. 11.

Figure 11:
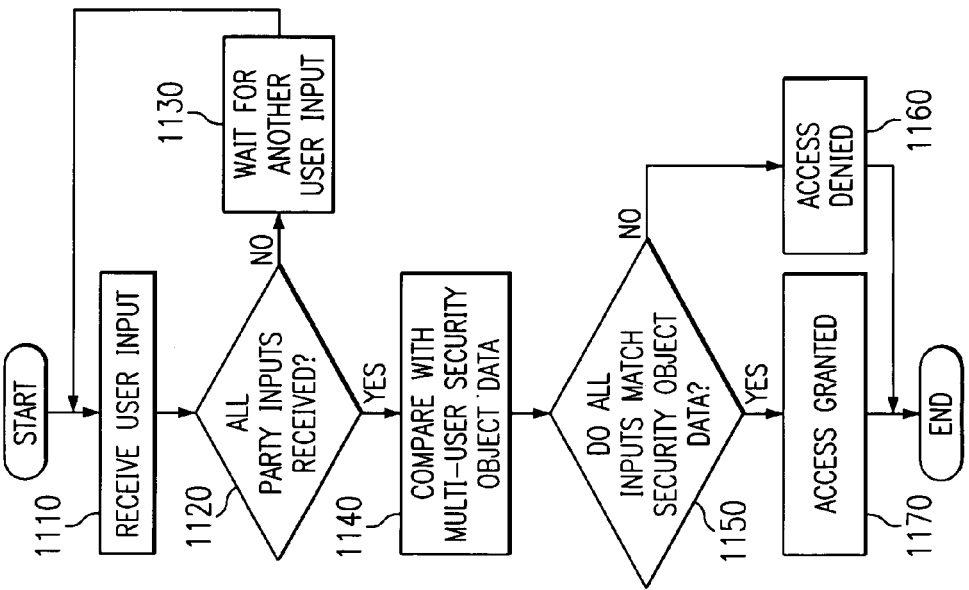
FIG. 11 is a flowchart outlining an exemplary operation of the present invention with a concurrent multi-user security object.

FIG. 11 is a flowchart outlining the operation of the multi-user security object of the present invention. As shown in FIG. 11, the operation starts with receiving an input from a user (step 1110). A check is made to see if all party inputs have been received (step 1120). If not, the operation waits for another input from a user (step 1130) and returns to step 1110 when a user input is received.

If all party inputs have been received, the operation then compares the inputs received with the multi-user security object data (step 1140). A determination is made as to whether any of the inputs do not match the security object data (step 1150). If any do not match, access is denied (step 1160) and the operation ends. If all match the security object data, access is granted (step 1170) and the operation ends.

Security Object Throttle

The present invention may be implemented as a security object throttle in which access is granted only after particular time intervals. Such a security object may be useful in thwarting attempts to crack the security object using brute force, such as by a dictionary word entry method. In addition, such a security object may be useful to service providers that wish to use it as a mechanism for performing load-balancing by allowing users access to a service only on a periodic basis.

The security object throttle only allows access only on a prescribed period. For example, only n-uses of the security object per day, usage only every other hour, and the like. Once a security object is used, it cannot be reused until the prescribed period has elapsed.

In order to provide a security object throttle, the user must provide the security object data and one or more attributes identifying the time intervals at which the security object is valid. This security object data and attributes are encapsulated with one or more methods for performing functions on the security object data, attributes and any inputs passed to the security object. These methods may be obtained from the security object throttle class. Thereafter, the security object may be used by a security system in the manner described in FIG. 12.

Figure 12:
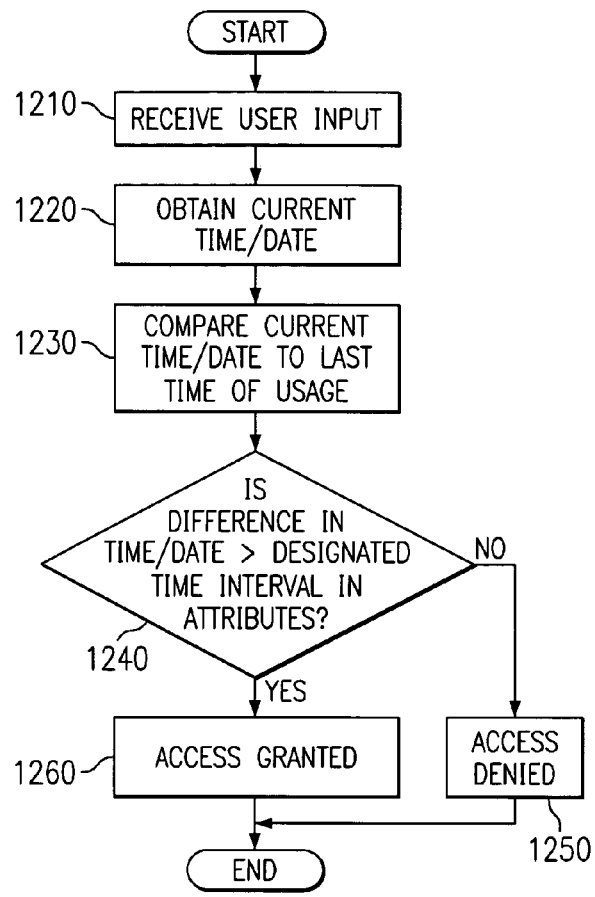
FIG. 12 is a flowchart outlining an exemplary operation of the present invention with a security object throttle.

As shown in FIG. 12, the operation starts with receipt of user input (step 1210). A current time and/or date is obtained from a system clock (step 1220). The current time and/or date is compared to a last time of usage of the security object to obtain a difference (step 1230). A check is made to determine whether the difference is greater than the designated time interval in the attributes of the security object (step 1240). If not, access is denied (step 1250) and the operation ends. If so, access is granted (step 1260) and the operation ends.

Translated Security Objects

The present invention may further be used to provide translated security objects. With such security objects, voice or text security object data may be entered in a first language, the security object may translate this voice or text security object data into a second language, and uses the translated voice or text security object data in the second language as the security object data. Such a security object allows for group security objects in which members of the group speak or read different languages. The voice or text security object data is unique for each language, yet the end-result is the same password for all members of the group. For example, if the voice security or text object data comprises the words "thank you" in English, another member of the group may enter "gracias" and still be authenticated because the word "gracias" is Spanish for "thank you." In order to provide such a security object, a user may designate the standard language to which entered voice or text security object data is to be translated and provide the voice or text security object data. Thereafter, individual users, such as in a group security object, may enter their own voice or text input data and a designation of the language of their voice or text input. The voice or text input may then be translated to the designated standard language and compared to the security object data. If there is a match, access is granted.

Figure 13:
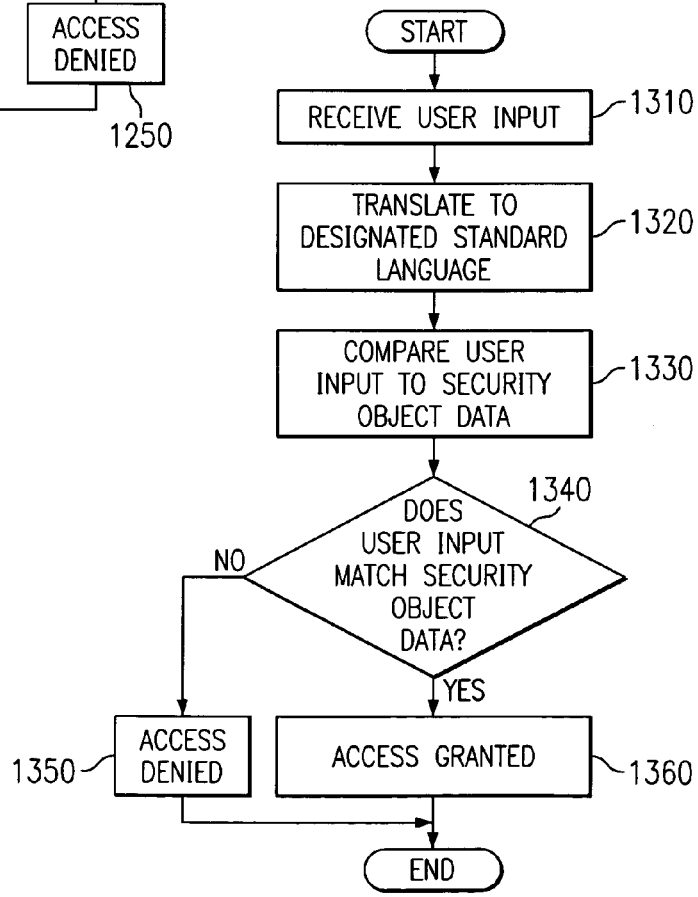
FIG. 13 is a flowchart outlining an exemplary operation of the present invention with a translated security object.

FIG. 13 is a flowchart outlining the above operation. As shown in FIG. 13, the operation starts with receipt of a user input designating a voice or text input and a language of the voice or text input (step 1310). The input is translated to the designated standard language (step 1320). The input is then compared to the security object data (step 1330). A determination is made as to whether there is a match (step 1340). If not, access is denied (step 1350) and the operation ends. If so, access is granted (step 1360) and the operation ends.

Security Objects Augmented By CPU ID/Speed/System Configuration

The present invention may be used to provide security objects that permit access only from certain computers, only with computing devices having a specific CPU speed, computing devices having a specific configuration. With such a security object, a user may either enter the security object data directly into the security foundry when creating the security object or the security foundry may obtain this information automatically from the computing device being used by the user. This information is then encapsulated as security object data with appropriate attributes and methods. Thereafter, when the user wishes to gain access to secure contents the user may invoke the security object at which time the operation in FIG. 14 is performed.

As shown in FIG. 14, the operation starts with an invocation of the security object (step 1410). The security object retrieves system configuration information, such as the CPU ID, CPU speed, and/or the actual hardware configuration of the user's computing device (step 1420). This configuration information is then compared to the stored security object data (step 1430). A determination is made as to whether the system configuration information matches the stored security object data (step 1440). If not, access is denied (step 1450) and the operation ends. If so, access is granted (step 1460) and the operation ends.

Security Objects for Specific Locations

The present invention may be used to provide security objects that are keyed to the particular location of the user. With this embodiment, when a user generates a security object, the location of the user's computing device may be entered by the user or obtained automatically from a location determination device, such as a global positioning system (GPS) or the like. This location information may then be used as the security object data and encapsulated with appropriate attributes and methods. Thereafter, the operation shown in FIG. 15 may be used by the security object.

As shown in FIG. 15, the operation starts with an invocation of the security object (step 1510). A current location of the user's computing device is retrieved (step 1520). This may be done by, for example, requesting the location information for a GPS device associated with the user's computing device. The current location is then compared to the stored security object data (step 1530). A determination is made as to whether the two quantities match (step 1540). If not, access is denied (step 1550) and the operation ends. If so, access is granted (step 1560) and the operation ends.

Similar functionality as that shown in FIGS. 9–15 may be provided with other sources of security object data including a current window and/or pointer position on a user's computing device; an Internet Protocol (IP) address of the user's computing device; a screen background image, intensity, color, or the like, of a user's computing device, a personal identification number entered by a user and a speed or number of times of a card swipe of a magnetic stripe card or smart card by the user, a user's mobile telephone ring tone or mobile telephone identification number, caller identification information for a user, current environmental conditions of a user's surroundings, and the like. Of course other embodiments are possible as well without departing from the spirit and scope of the present invention.

Thus, the present invention provides a versatile security object that may be easily contained in any type of device have data storage and transmission capabilities. The security object may be used to authenticate any type of security data without limitation. By using the security object of the present invention, a security system need not be made aware of the type of security object data being authenticated or coded with routines for handling the security object data. Because the possibilities for the types of security object data and their usages is limitless,the ability to "crack" the security object for a user is made extremely difficult.

In addition, since the user defines his/her own security object, and the security system acts as simply a repository for security objects, much of the liability of maintaining security is off loaded from the owner/operator of the security system onto the individual users. The owner/operator of the security system need only maintain the object in a secured manner within the repository.

It is important to note that while the present invention has been described in the context of a fully functioning data processing system, those of ordinary skill in the art will appreciate that the processes of the present invention are capable of being distributed in the form of a computer readable medium of instructions in a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of generating a security object for use in authenticating a user to access an item, comprising computer-implemented steps of:
   receiving security object data;
   setting one or more attributes associated with the security object data, wherein the one or more attributes include a user designation of a security object type; and
   encapsulating, within the security object, the security object data and the one or more attributes with one or more methods, wherein the security object is used to authenticate the user by validating an identity of the user using at least one of the one or more methods encapsulated within the security object.

2. The computer-implemented method of claim 1, further comprising obtaining the one or more methods from a security object class.

3. The computer-implemented method of claim 1, wherein the one or more methods operate on the security object data and one or more attributes.

4. The computer-implemented method of claim 1, wherein the one or more methods operate on the security object data and input data provided by the user and pa sued to the security object to authenticate the user to access the item.

5. The computer-implemented method of claim 1, wherein the security object data is one of textual data, audio data, graphical data, and biometric data.

6. The computer-implemented method of claim 1, wherein the security object type is one of a single use security object, a group security object, a timed security object, a concurrent multi-user security object, a security object throttle, a translated password security object, a security object augmented by a at least one of a CPU identifier, a CPU speed and a system configuration, a Wave file or MP3 security object, an image file security object, a security object augmented by a location of the user, a security object augmented by a current window and/or pointer position, a security object augmented by an IP address, a security object augmented by a screen background characteristic, a security object augmented by a personal identification number one of a speed of a card swipe and a number of times of a card swipe, a security object augmented by a mobile telephone ring or mobile telephone identification number, a security object augmented by a caller identification of the user, and a security object augmented by an environmental condition.

7. The computer-implemented method of claim 1, further comprising:
   providing the security object to a security system, wherein the security system is a hardware data processing system that stores the security object and associates the security object with a user identification so tat the security object may be retrieved when the user enters their identification in order to gain access to the item.

8. The computer-implemented method of claim 7, wherein the security system invokes the security object in response to a request for access to the item by the user.

9. The computer-implemented method of claim 1, storing the security object data on an electronic medium in a device with data transmission capability.

10. The computer-implemented method of claim 9, wherein the device is a portable device.

11. The computer-implemented method of claim 9, wherein the portable device is one of a keychain, a portable MP3 player, a mobile telephone, a pager, en electronic wrist watch, a remote control, a garage door transmitter, a keyless entry device for a vehicle, a smartcard, and a magnetic stripe card.

12. The computer-implemented method of claim 7, wherein the security object contains a partial set of methods and wherein the security system contains a complementary sot of methods.

13. The computer-implemented method of claim 1, wherein the security object requires hardware assistance for authentication of input data passed to the security object.

14. The computer-implemented method of claim 1, wherein the security object data is received from a client apparatus.

15. The computer-implemented method of claim 1, wherein the security object data is received from a user via a user interface.

16. The computer-implemented method of claim 15, wherein the user interface is a security object foundry application resident on a computing device.

17. The computer-implemented method of claim 15, wherein the user interface is an interface transmitted from a server apparatus to a client apparatus.

18. A computer program product in a computer readable medium for generating a security object for use in authenticating a user to access an item, comprising:
   first instructions for receiving security object data;
   second instructions for setting one or more attributes associated with the security object data, wherein the one or more attributes include a user designation of a security object type; and
   third instructions for encapsulating, within the security object, the security object data and the one or more attributes with one or more methods, wherein the security object is used to authenticate the user by validating an identity of the user using at least one of the one or more methods encapsulated within the security object.

19. The computer program product of claim 18, fourth instructions for obtaining the one or more methods from a security object class.

20. The computer program product of claim 18, wherein the one or more methods operate on the security object data and one or more attributes.

21. The computer program product of claim 18, wherein the one or more methods operate on the security object data and input data provided by the user and passed to the security object to authenticate the user to access the item.

22. The computer program product of claim 18, wherein the security object data is one of textual data, audio data, graphical data, and biometric data.

23. The computer program product of claim 18, wherein the security object type is one of a single use security object, a group security object a timed security object, a concurrent multi-user security object, a security object throttle, a translated password security object, a security object augmented by a at least one of a CPU identifier, a CPU speed and a system configuration, a Wave file or MP3 security object, an image file security object, a security object augmented by a location of the user, a security object augmented by a current window and/or pointer position, a security object augmented by an IP address, a security object augmented by a screen background characteristic, a security object augmented by a personal identification number and one of a speed of a card swipe and a number of times ate card swipe, a security object augmented by a mobile telephone ring or mobile telephone identification number, a security object augmented by a caller identification of the user, and a security object augmented by an environmental condition.

24. The computer program product of claim 18, further comprising:
fourth instructions for providing the security object to a security system, wherein the security system is a hardware data processing system that stores the security object and associates the security object with a user identification so that the security object may be retrieved when the user enters their identification in order to gain access to the item.

25. The computer program product of claim 24, wherein the security system invokes the security object in response to a request for access to the item by the user.

26. The computer program product of claim 18, further comprising fourth instructions for storing the security object data on an electronic medium in a device with data transmission capability.

27. The computer program product of claim 18, further comprising fourth instructions for staring the security object data in a portable device.

28. The computer program product of claim 27, wherein the portable device is one of a keychain, a portable MP3 player, a mobile telephone, a pager, an electronic wrist watch, a remote control, a garage door transmitter, a keylees entry device for a vehicle, a smartcard, and a magnetic stripe card.

29. The computer program product of claim 24, wherein the security object contains a partial set of methods and wherein the security system contains a complementary set of methods.

30. The computer program product of claim 18, wherein the security object requires hardware assistance for authentication of input data passed to the security object.

31. The computer program product of claim 18, wherein the security object data is received from a client apparatus.

32. The computer program product of claim 18, wherein the security object data is received from a user via a user interface.

33. The computer program product of claim 32, wherein the user interface is a security object foundry application resident on a computing device.

34. The computer program product of claim 32, wherein the user interface is an interface transmitted from a server apparatus to a client apparatus.

35. The apparatus of claim 18, further comprising means for storing the security object data on an electronic medium in a device, with data transmission capability.

36. The apparatus of claim 35, wherein the device is a portable device.

37. The apparatus of claim 36, wherein the portable device is one of a keychain, a portable MP3 player, a mobile telephone, a pager, an electronic wrist watch, a remote control, a garage door transmitter, a keyless entry device for a vehicle, a smartcard, and a magnetic stripe card.

38. An apparatus for generating a security object for use in authenticating a user to access an item, comprising:
means for receiving security object data;
means for setting one or more attributes associated with the security object data, wherein the one or more attributes include a user designation of a security object type; and
means for encapsulating, within the security object, the security object data and the one or more attributes with one or more methods, wherein the security object is used to authenticate the user by validating an identity of the user using at least one of the one or more methods encapsulated within the security object.

39. The apparatus of claim 38, means for obtaining one or more methods from a security object class.

40. The apparatus of claim 38, wherein the one or more methods operate on the security object data and one or more attributes.

41. The apparatus of claim 38, wherein to one or more methods operate on the security object data and input data provided by the user and passed to the security object to authenticate the user to access the item.

42. The apparatus of claim 38, wherein the security object data is one of textual data, audio data, graphical data, and biometric data.

43. The apparatus of claim 38, wherein the security object type is one of a single use security object, a group security object, a timed security object, a concurrent multi-user security object a security object throttle, a translated password security object, a security object augmented by a at least one of a CPU identifier, a CPU speed and a system configuration, a Wave file or MP3 security object an image file security object, a security object augmented by a location of the user, a security object augmented by a current window and/or pointer position, a security object augmented by an IP address, a security object augmented by a screen background characteristic, a security object augmented by a personal identification number and one of a speed of card swipe and a number of times of a card swipe, a security object augmented by a mobile telephone ring or mobile telephone identification number, a security object augmented by a caller identification of the user, and a security object augmented by an environmental condition.

44. The apparatus of claim 38, further comprising:
means for providing the security object to a security system, wherein the security system is a hardware data processing system tat stores the security object and associates the security object with a user identification so that the security object may be retrieved when the user enters their identification in order to gain access to the item.

45. The apparatus of claim 44, wherein the security system invokes the security object in response to a request for access to the item by the user.

46. The apparatus of claim 44, wherein the security object contains a partial set of methods end wherein the security system contains a complementary set of methods.

47. The apparatus of claim 38, wherein the security object requires hardware assistance for authentication of input data passed to the security object.

48. The apparatus of claim 38, wherein the security object data is received from a client apparatus.

49. The apparatus of claim 38, wherein the security object data is received from a user via a user interface.

50. The apparatus of claim 49, wherein the user interface is a security object foundry application resident on a computing device.

51. The apparatus of claim 49, wherein the user interface is an interface transmitted from a server apparatus to a client apparatus.

* * * * *